(12) United States Patent
Grant et al.

(10) Patent No.: US 9,050,529 B2
(45) Date of Patent: Jun. 9, 2015

(54) FORCE FEEDBACK TRIGGERS

(75) Inventors: Anthony John Grant, Redmond, WA (US); Gary Strowe, Snohomish, WA (US); Eph John Evans, Kent, WA (US); Glen E. Tennison, Monroe, WA (US); Vasco Rubio, Edmonds, WA (US); Loren Reas, Kent, WA (US); Jeffrey Vah, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 582 days.

(21) Appl. No.: 13/361,830

(22) Filed: Jan. 30, 2012

(65) Prior Publication Data

US 2013/0194085 A1 Aug. 1, 2013

(51) Int. Cl.
| | |
|---|---|
| G08B 6/00 | (2006.01) |
| G06F 19/00 | (2011.01) |
| G09G 5/00 | (2006.01) |
| G06F 3/033 | (2013.01) |
| A63F 13/20 | (2014.01) |
| G06F 3/01 | (2006.01) |

(52) U.S. Cl.
CPC ............... *A63F 13/06* (2013.01); *G06F 3/016* (2013.01); *A63F 2300/1037* (2013.01); *A63F 2300/1043* (2013.01)

(58) Field of Classification Search
USPC ............. 340/407.1, 407.2; 463/7, 30, 36–39; 345/156, 161, 163, 168, 184
See application file for complete search history.

(56) References Cited

U.S. PATENT DOCUMENTS

| | | | |
|---|---|---|---|
| 5,857,986 | A | 1/1999 | Moriyasu |
| 6,693,622 | B1 | 2/2004 | Shahoian et al. |
| 7,335,134 | B1 * | 2/2008 | LaVelle ............................ 482/1 |
| 7,561,141 | B2 | 7/2009 | Shahoian et al. |
| 7,967,679 | B2 | 6/2011 | Ombrellaro et al. |
| 8,259,066 | B2 * | 9/2012 | Cheng et al. .................. 345/163 |

(Continued)

FOREIGN PATENT DOCUMENTS

| | | |
|---|---|---|
| CN | 1178996 A | 4/1998 |
| CN | 1494939 A | 5/2004 |

(Continued)

OTHER PUBLICATIONS

International Search Report, Mailed Date: May 14, 2013, Application No. PCT/US2013/023695, Filed Date: Jan. 30, 2013, pp. 9.

(Continued)

*Primary Examiner* — George Bugg
*Assistant Examiner* — Renee Dorsey
(74) *Attorney, Agent, or Firm* — Brandon Roper; Judy Yee; Micky Minhas

(57) ABSTRACT

A force feedback trigger includes an input device comprising a communication subsystem configured to provide bidirectional communication with a computing device. The input device further comprises a force feedback trigger assembly including a user-actuatable trigger configured to pivot about a trigger axis responsive to an applied external force. The input device further comprises a trigger vibrator directly coupled to the force feedback trigger assembly and communicatively coupled to the communication subsystem, the trigger vibrator configured to vibrate the user-actuatable trigger responsive to a vibration signal received from the computing device via the communication subsystem.

22 Claims, 4 Drawing Sheets

(56) References Cited

U.S. PATENT DOCUMENTS

| | | | |
|---|---|---|---|
| 2004/0166939 A1 | 8/2004 | Leifer et al. | |
| 2005/0130739 A1* | 6/2005 | Argentar | 463/36 |
| 2006/0046843 A1 | 3/2006 | Nakajima | |
| 2006/0281550 A1 | 12/2006 | Schena | |
| 2007/0195059 A1* | 8/2007 | Shahoian et al. | 345/156 |
| 2008/0064500 A1 | 3/2008 | Satsukawa et al. | |
| 2008/0227546 A1 | 9/2008 | Roberts | |
| 2008/0297328 A1 | 12/2008 | Crawford et al. | |
| 2009/0124378 A1* | 5/2009 | Takada et al. | 463/30 |
| 2009/0131171 A1 | 5/2009 | Miyazaki | |
| 2009/0233769 A1 | 9/2009 | Pryor | |
| 2010/0160016 A1 | 6/2010 | Shimabukuro et al. | |
| 2010/0261513 A1* | 10/2010 | Izen et al. | 463/7 |
| 2011/0095877 A1 | 4/2011 | Casparian et al. | |
| 2011/0163860 A1 | 7/2011 | Ryu et al. | |
| 2011/0172015 A1 | 7/2011 | Ikeda et al. | |
| 2012/0028677 A1* | 2/2012 | Rofougaran | 455/550.1 |
| 2012/0115584 A1* | 5/2012 | Nguyen et al. | 463/25 |
| 2012/0302347 A1* | 11/2012 | Nicholson | 463/37 |

FOREIGN PATENT DOCUMENTS

| | | |
|---|---|---|
| JP | 2009-233108 A | 10/2009 |
| KR | 10-2005-0021500 A | 3/2005 |

OTHER PUBLICATIONS

Grant, Anthony J. et al., "Multi-Stage Variable Resistance Trigger," U.S. Appl. No. 13/315,734, filed Dec. 9, 2011, 35 pages.

Michelitsch, et al., "Multi-Finger Haptic Interaction within the MIAMM Project", Retrieved at <<http://miamm.loria.fr/doc_publique/publications/EuroHapticsAbstract.pdf>>, EuroHaptics, Jul. 8-10, 2002, pp. 6.

Casiez, et al., "Elastic Force Feedback with a New Multi-finger Haptic Device: The DigiHaptic", Retrieved at <<http://www.lifl.fr/~casiez/publications/eurohaptics03-casiez.pdf>>, Eurohaptics, Jul. 6-9, 2003, pp. 6.

Alahakone, et al., "Vibrotactile Feedback Systems: Current Trends in Rehabilitation, Sports and Information Display", Retrieved at <<http://ieeexplore.ieee.org/stamp/stamp.jsp?tp=&arnumber=5229741>>, IEEE/ASME International Conference on Advanced Intelligent Mechatronics, Jul. 14-17, 2009, pp. 1148-1153.

Johansson, et al., "Using Simple Force Feedback Mechanisms as Haptic Visualization Tools", Retrieved at <<http://ieeexplore.ieee.org/stamp/stamp.jsp?tp=&arnumber=776980>>, Instrumentation and Measurement Technology Conference, May 26, 1999, pp. 820-824.

State Intellectual Property Office of the People's Republic of China, First Office Action and Search Report Issued in Chinese Patent Application No. 201310033731.1, Mar. 9, 2015, 10 pages.

* cited by examiner

FORCE FEEDBACK TRIGGERS

BACKGROUND

Gaming controllers often include one or more vibrators. However, such gaming controllers often do not provide a satisfying gaming experience because the vibrators do not provide the user with realistic feedback.

SUMMARY

Embodiments are disclosed that relate to force feedback triggers. One disclosed embodiment includes an input device comprising a communication subsystem configured to provide bidirectional communication with a computing device. The input device further comprises a force feedback trigger assembly including a user-actuatable trigger configured to pivot about a trigger axis responsive to an applied external force. The input device further comprises a trigger vibrator directly coupled to the force feedback trigger assembly and communicatively coupled to the communication subsystem, the trigger vibrator configured to vibrate the user-actuatable trigger responsive to a vibration signal received from the computing device via the communication subsystem.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to a computing system input device including a force feedback trigger assembly configured to vibrate a user-actuatable trigger responsive to a vibration signal received from a computing device. Input devices, such as game controllers, may often include one or more vibrators configured to vibrate the entire game controller body such that the vibration is felt in the palm of the hand(s) supporting the controller. However, such vibration may not apply distinctive feeling to the user's finger(s) (e.g., index finger).

In contrast, a force feedback trigger assembly, when used in conjunction with a gaming device, may provide a more realistic gaming experience. For example, in a first-person shooting game, a force feedback trigger assembly may provide a feel to the user through the user's finger(s) approximating the feel of the trigger assembly on a real or fantasy weapon. The timing, duration, and amplitude of the vibration pulse may be synchronized to game play events. For example, the vibration pulse may be synchronized with the user seeing and hearing a gun recoil event. This pulse may also be repeated in quick succession to mimic a multi-shot weapon, or may be pulsed during release of a fantasy style weapon that recoils during trigger release.

Figure 1:
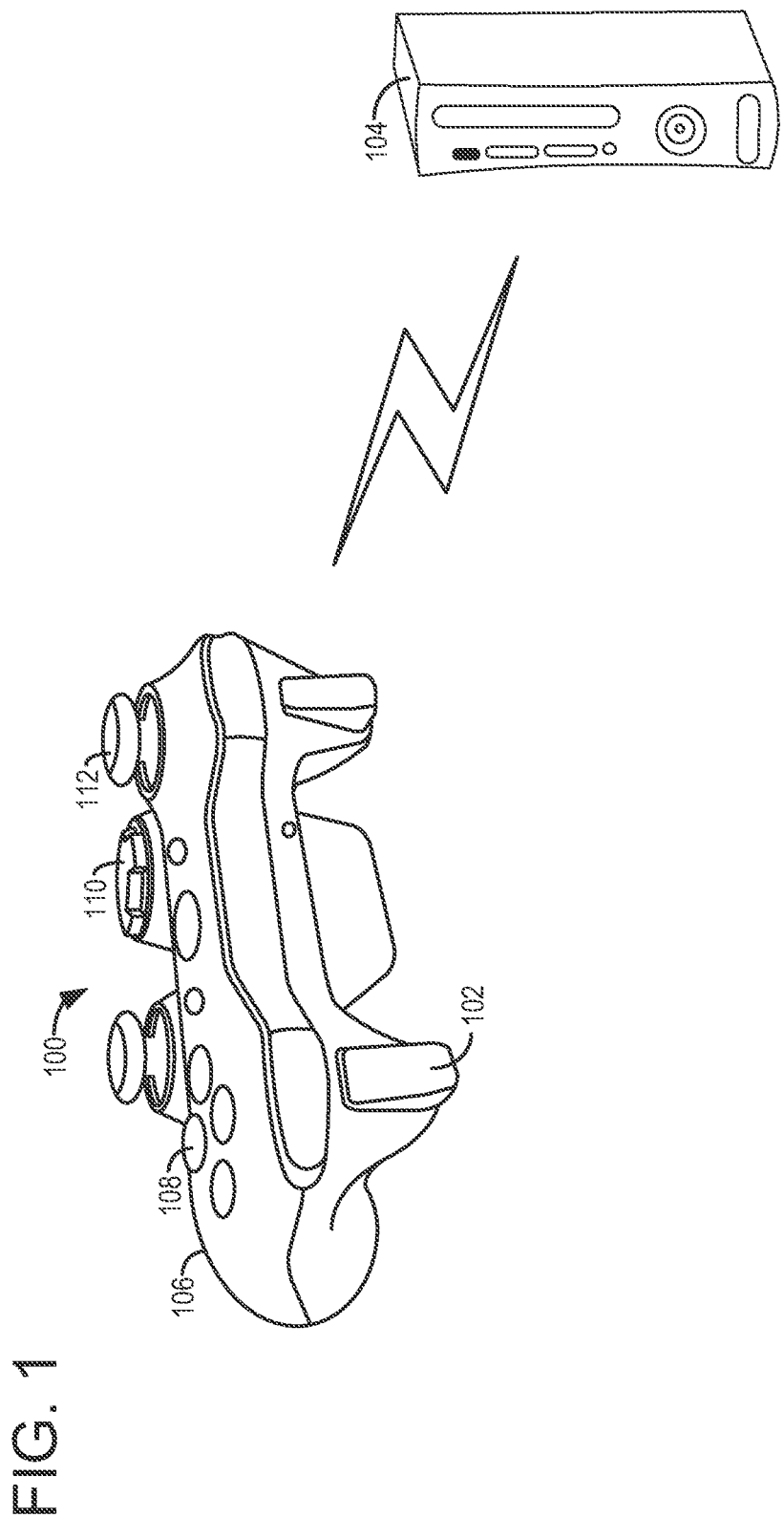
FIG. 1 shows a non-limiting example of an input device in accordance with an embodiment of the present disclosure.

FIG. 1 shows a non-limiting example of an input device 100 in accordance with an embodiment of the present disclosure. Input device 100 includes trigger 102. Triggers, as discussed in the entirety of this application, refer to any user-actuatable input mechanism. Input device 100 further includes a communication subsystem configured to provide bidirectional communication with computing device 104. Input device 100 may be configured to send control information to computing device 104 for controlling the computing device. Input device 100 may be further configured to receive from computing device 104 one or more vibration signals configured to effect vibration of the controller body and/or the trigger. Vibration signals will be discussed in more detail below.

The input device may communicate with computing device 104 via a wireless connection, a wired connection, or a combination thereof. For example, the wireless communication may be performed via infrared light, visible light, radio-frequency (e.g., 802.11 or mobile telephony), or a combination thereof. The communication may be accomplished via any combination of encodings, carrier frequencies, and protocols, both open and proprietary. Input device 100 may be used, for example, to control the motion of a game character rendered by computing device 104 and displayed via a display device.

Input device 100 includes a hollow body 106 configured to be held in one or both hands. It will be understood that body 106 is "hollow" in that body 106 forms one or more cavities in which other elements of input device 100, in whole or in part, are oriented. Body 106 is further configured to provide support and/or positioning for trigger 102 and other input mechanisms (e.g., buttons 108, directional pad 110, and joystick 112). Body 106 may comprise a plurality of individual pieces mechanically coupled to form body 106. For example, individual pieces may be coupled using adhesive, screws, pressure fittings (e.g., snap-together), or a combination thereof. It will be understood that these scenarios are presented for the purpose of example, and are not intended to be limiting in any manner.

Trigger 102 may be configured to be actuated by one or more fingers (e.g., an index finger). In other embodiments, trigger 102 may be configured to be actuated by other mechanisms. It will be understood that trigger 102 and/or input mechanisms 108, 110, and 112 may be arranged within or upon body 106 of input device 100 in any suitable configuration. For example, although trigger 102 is illustrated on the rear of input device 100, in some embodiments trigger 102 may be arranged on the top of input device 100.

Figure 2:
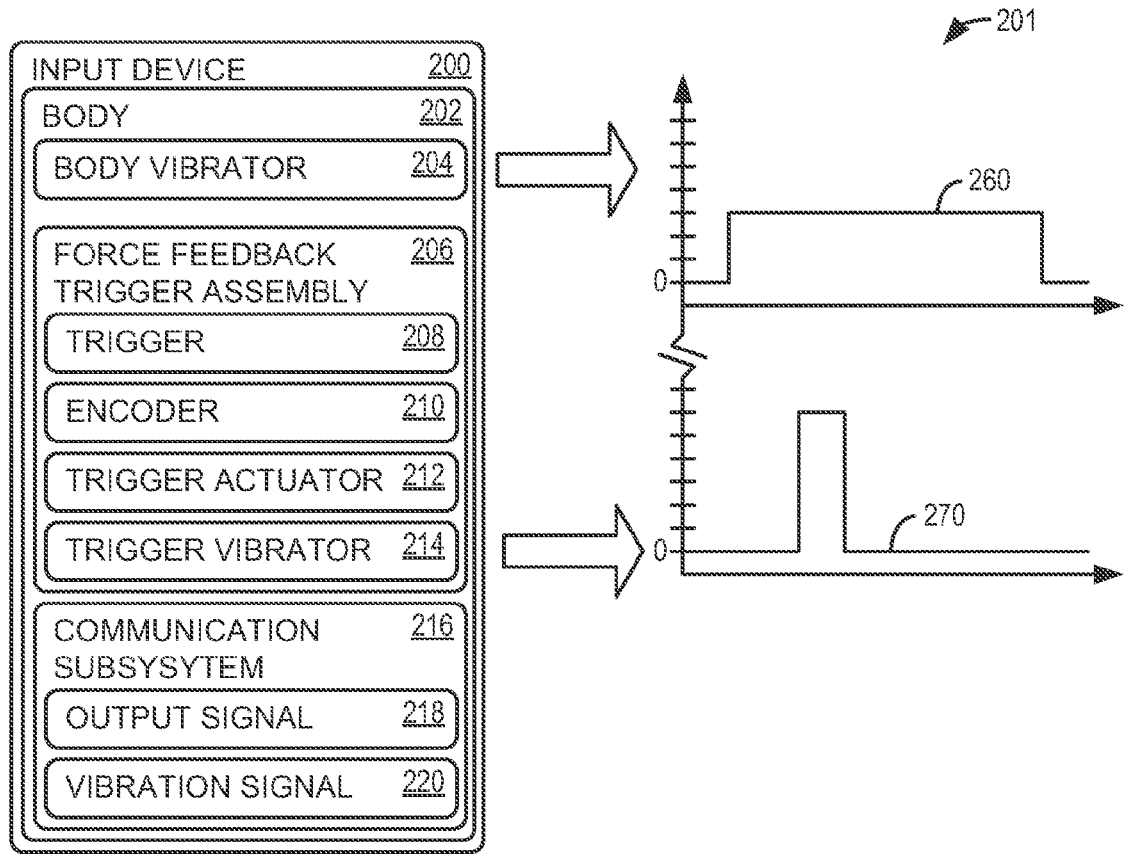
FIG. 2 schematically shows a non-liming input device and a visual representation of example vibration signals in accordance with an embodiment of the present disclosure.

FIG. 2 schematically shows a non-limiting input device 200 and a visual representation 201 of example vibration signals in accordance with an embodiment of the present disclosure. Input device 200 includes a body 202 (e.g., body 106 of FIG. 1). Body 202 may be mechanically coupled to body vibrator 204 and force feedback trigger assembly 206. Body vibrator may include one or more discrete vibrators configured to provide vibration to body 202, and thus to the palm(s) of the user of input device 200.

Force feedback trigger assembly 206 is configured to receive user input and to provide force feedback to the user. In order to receive user input, assembly 206 includes a trigger 208 (e.g., trigger 102 of FIG. 1). Trigger 208 is configured to rotate about an axis or otherwise move under an applied external force (e.g., via a user's index finger). One or more pull parameters (e.g., displacement, velocity, acceleration, angle, absolute position) of said movement may be translated via one or more encoders 210 into one or more electrical signals. Example encoders 210 include, but are not limited to, mechanical sensors (e.g., limit switch), optical sensors (e.g., optical encoder or optical break sensor), magnetic sensors (e.g., magnetic reed switch), capacitive sensors, or a combination thereof. Said electrical signal may be either digital or analog.

In some embodiments, encoders 210 may be directly coupled to trigger 208. In other embodiments, assembly 206 may further include trigger actuator 212 to which encoder 210 is coupled. Trigger actuator 212 may be one or more mechanisms mechanically coupled to trigger 208 and encoder 210. Actuator 212 may be configured to translate motion of trigger 208 into motion recognized by encoders 210.

Assembly 206 further includes trigger vibrator 214. Trigger vibrator 214 is mechanically coupled to one or more elements of assembly 206. As such, vibrator 214 is configured to effect vibration of trigger 208, and thus provides force feedback to the user. Vibrator 214 may be any device, or combination of devices, capable of effecting vibration in response to one or more electrical signals.

Input device 200 further includes communication subsystem 216 configured to provide bidirectional communication between input device 200 and a computing device (e.g., computing device 104 of FIG. 1). It will be understood that in some embodiments, communication subsystem 216 may be configured to provide unidirectional communication from input device 200 to the computing device. Communication subsystem 216 may be configured to provide an output signal 218 for controlling the computing device. Communication subsystem 216 may be further configured to receive, from the computing device, one or more vibration signals 220 configured to effect vibration of body 202 and/or trigger 208.

FIG. 2 also shows a visual representation 201 of example vibration signals provided to body vibrator 204 and to trigger vibrator 214. Specifically, representation 201 shows the amplitude (e.g., voltage) of signals 260 and 270 versus time. Signals 260 and 270 are provided to body vibrator 204 and trigger vibrator 214 respectively. It will be understood that signals 260 and 270 are depicted on the same axes.

As shown, signal 260 is of smaller amplitude and longer duration than signal 270. As such, signal 260 may effect a lower-intensity vibration over a longer period of time (e.g., "rumble"), whereas signal 270 may effect a higher-intensity vibration of a shorter period of time. Although signal 260 is illustrated as occurring before signal 270, it will be understood that signals 260 and 270 may be temporally oriented in any manner. As mentioned above, signal 270 may be pulsed, such as to mimic recoil of a firing weapon. It will be understood that signals 260 and 270 are presented for the purpose of example, and are not meant to be limiting in any way. Instead, signals 260 and 270 are provided to illustrate an example relative amplitude and duration of signals provided to body vibrator 204 and to trigger vibrator 214.

Figure 3A:
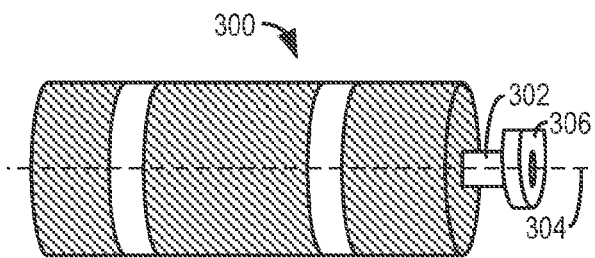
FIG. 3A shows a side-view of a non-limiting example of a rotary motor configured to vibrate.

As mentioned, body vibrator 204 and trigger vibrator 214 may be any device, or combination of devices, configured to vibrate. FIG. 3A shows a side-view of a non-limiting example of a rotary motor 300 configured to vibrate. Motor 300, in response to one or more applied electrical signals, is configured to rotate shaft 302 about motor axis 304. In some embodiments, motor 300 may be configured to only spin in one direction. In other embodiments, motor 300 may be configured to spin in both directions. Motor 300 further includes eccentric mass (sometimes referred to as an "offset weight") 306 coupled to shaft 302. Mass 306 may be any mass with a center-of-mass displaced form axis 304. As such, the rotation of mass 306 about axis 304 vibrates motor 300 and any mechanism coupled thereto. Although motor 300 is illustrated as being substantially cylindrical (and thus substantially radially symmetric about axis 304), it will be understood that motor 300 may be of any suitable shape.

Figure 3B:
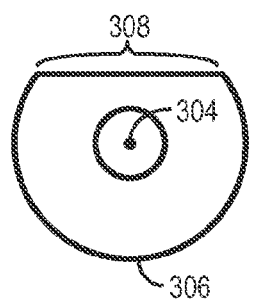
FIG. 3B shows a front-view of an eccentric mass of the rotary motor of FIG. 3A.

FIG. 3B shows a front-view of an eccentric mass 306 of FIG. 3A. Mass 306 includes profile 308 to define the eccentricity of mass 306. While mass 306 is illustrated as being substantially circular with a single profile 308, it will be understood that mass 306 may be of any suitable shape with any number of suitable profiles 308, such that mass 306 is eccentric about axis 304 (illustrated as a point). For example, in some embodiments, mass 306 may be rectangular.

Figure 4A:
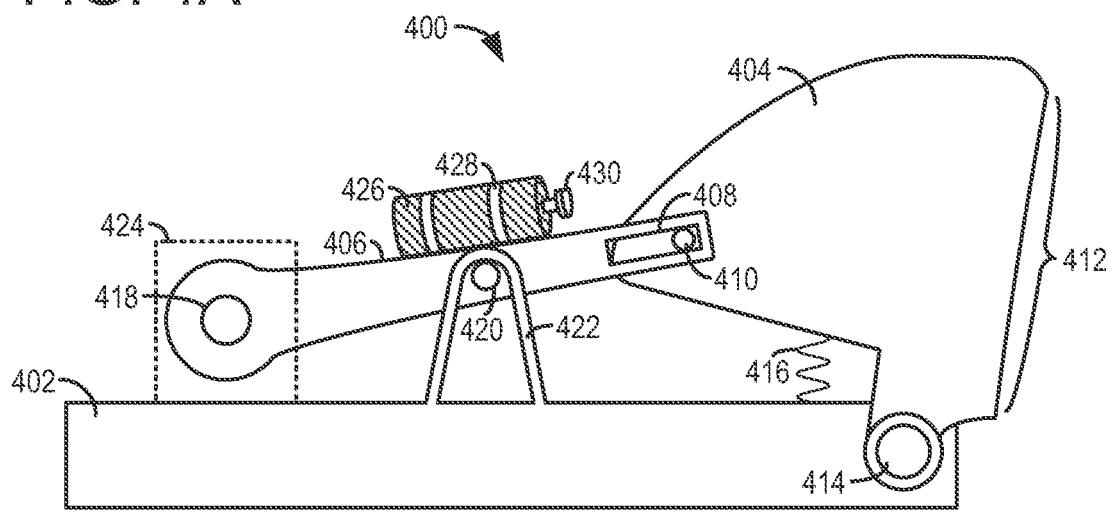
FIG. 4A shows a non-limiting example of a force feedback trigger assembly in accordance with an embodiment of the present disclosure.

FIG. 4A shows a non-limiting example of a force feedback trigger assembly 400 in accordance with an embodiment of the present disclosure. Assembly 400 includes support structure 402 configured to support or otherwise interact with one or more elements of assembly 400. While illustrated as a single structure, it will be understood that structure 402 may include a plurality of individual structures. In some embodiments, structure 402 may be incorporated into and/or coupled to the body of the input device (e.g., body 106 of FIG. 1 or body 202 of FIG. 2).

Assembly 400 further includes a trigger 404 at a rest position. It will be understood that the term "rest position" as used herein refers to the position of the trigger assembly absent an applied external force. Trigger 404 is mechanically coupled to trigger actuator 406. Trigger actuator 406 includes a guide 408 in which a follower 410 of trigger 404 is configured to move. In other embodiments, trigger 404 may include a guide (e.g., guide 408), and a follower (e.g., follower 410) may be coupled to trigger actuator 406. While illustrated as a substantially linear guide, it will be understood that guide 408 may be of any suitable shape. For example, in some embodiments, the guide may be arc-shaped. In some embodiments, trigger 404 may be coupled to trigger actuator 406 in another suitable manner. For example, trigger actuator 406 may include a "fixed" notch into which a pivot may be inserted.

As force is applied to edge 412 of trigger 404 (e.g., via an index finger), trigger 404 is configured to rotate about trigger axis 414. As trigger 404 rotates about axis 414, trigger 404 interacts with trigger spring 416. Specifically, trigger spring 416 resists pivoting of trigger 404 about axis 414 throughout the entire range of motion of trigger 404. In some embodiments, spring 416 may include more than one spring operating in parallel and/or series. Trigger spring 416 may be coupled to trigger 404 and to structure 402 in any suitable manner. For example, spring 416 may be attached to trigger 404 and/or structure 402 with adhesive. In other embodiments, spring 416 may be configured to partially extend over a tab of trigger 404 and/or a tab of structure 402. It will be understood that such scenarios are provided for the purpose of example and are not meant to be limiting in any manner.

Furthermore, as trigger 404 rotates, follower 410 moves within guide 408, thus causing trigger actuator 406 to rotate about actuator axis 418. The motion of actuator 406, and thus of trigger 404, may be restricted at one or both limits by the interaction between tab 420 coupled to actuator 406 and guide 422 coupled to structure 402. For example, as illustrated, said interaction may define the limiting "rest position" of assembly 400.

In some embodiments, trigger actuator 406 may be configured to move in a manner other than rotation. For example, trigger actuator 406 may be configured to translate the rotation of trigger 404 into substantially linear motion. As discussed above in reference to FIG. 2, one or more characteristics of the movement of trigger actuator 406 may be translated into one or more representative electrical signals via any suitable mechanism. For example, trigger actuator 406 may be coupled to the shaft of potentiometer 424. As such, the potentiometer may be configured to translate the rotation of trigger actuator 406 into electrical resistance.

Assembly 400 further includes trigger vibrator 426 (e.g., motor 300 of FIG. 3A) mechanically coupled to trigger actuator 406 via one or more mountings 428. In other embodiments, as discussed below in reference to FIGS. 5A-E, vibrator 426 may be coupled to the same or different element(s) of assembly 400 in the same or a different orientation. Although mountings 428 are illustrated as two "straps" around vibrator 426, it will be understood that vibrator 426 may be coupled to trigger actuator 406 via any suitable mechanism. For example, in some embodiments, vibrator 426 and actuator 406 may include complementary features such that one feature is configured to interact with the other (e.g., slide into, snap into, etc.). In other embodiments, vibrator 426 may be coupled to actuator 406 via adhesive.

Vibrator 426 is configured to rotate eccentric mass 430 about a motor axis (e.g., motor axis 304 of FIG. 3A). During rotation, the eccentricity of mass 430 effects vibration of motor 300. As motor 300 is coupled to trigger actuator 406, which in turn is coupled to trigger 404, vibration is therefore also effected in trigger 404. Although vibrator 426 is illustrated as a rotary motor, it will be understood that vibrator 426 may include any device, or combination of devices, configured to vibrate. For example, in some embodiments, vibrator 426 may include a piezoelectric vibrator.

In order to attenuate said vibration and/or to localize said vibration to assembly 400, one or more elements of assembly 400 may include any suitable damping material or combination of materials. Such damping material may be applied, for example, to one or more elements of assembly 400 coupled together (e.g., guide 408 and follower 410). In some embodiments, damping material may be applied between structure 402 and the body of the input device.

Figure 4B:
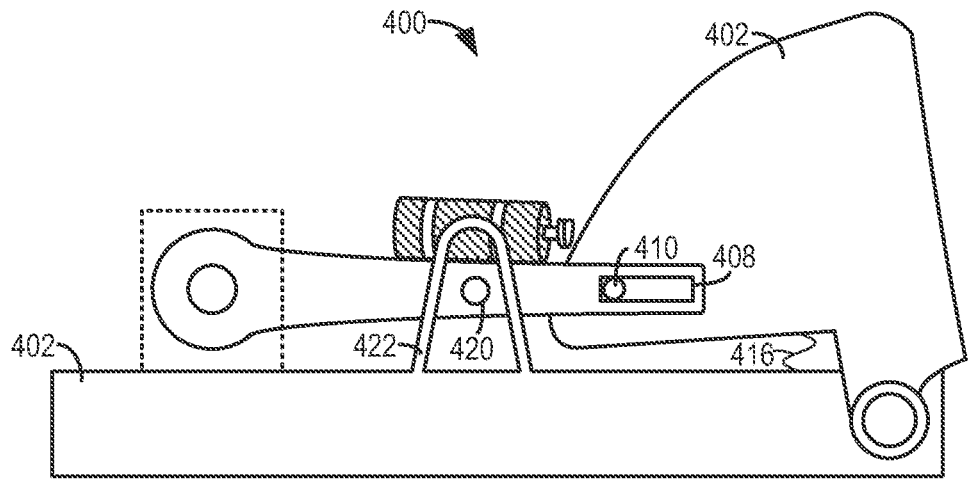
FIG. 4B shows the assembly of FIG. 4A at an end position.

Trigger 404 and trigger actuator 406 are configured to rotate until reaching an end position. It will be understood that the term "end position" as used herein refers to the limiting position of the trigger assembly under an external force. FIG. 4B shows the assembly 400 of FIG. 4A at an end position. As shown, the end position is defined via the interaction between an edge of guide 408 and follower 410. In other embodiments however, the end position may be defined via any one or more interactions between elements of assembly 400. For example, the end position may be defined by the maximum compression of trigger spring 416. In some embodiments, one or more edges of trigger 404 may interact with (e.g., strike) structure 402. In other embodiments, tab 420 may interact with guide 422 and/or structure 402.

As mentioned above, vibrator 426 may be couple to one or more elements of assembly 400 in any orientation and via any suitable mechanism. FIGS. 5A-E show various example attachment configurations of a trigger vibrator in accordance with different embodiments of the present disclosure.

Figure 5A:
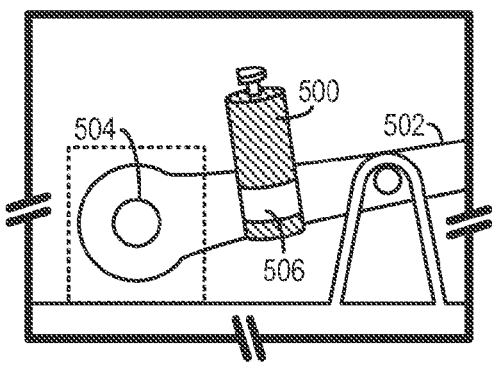
FIGS. 5A-F show various attachments of the trigger vibrator of FIG. 4A.

FIG. 5A shows a vibrator 500 coupled to a trigger actuator 502 and oriented substantially tangentially to actuator axis 504. Although vibrator 500 is illustrated as being coupled to actuator 502 via a single mounting 506 (as opposed to two mountings 428 in FIG. 4A), it will be understood that vibrator 500, as discussed above, may be coupled to actuator 502 via any suitable mechanism.

Figure 5B:
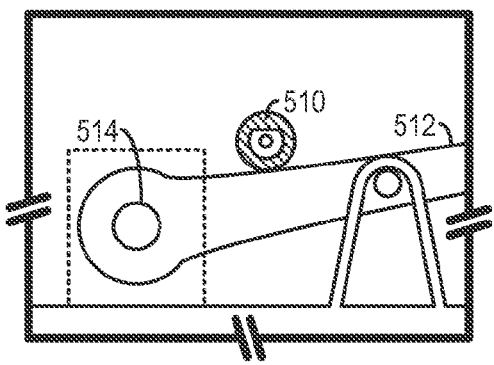

FIG. 5B shows vibrator 510 coupled to trigger actuator 512 and oriented substantially parallel to actuator axis 514.

FIG. 5C-F shows vibrators 520, 530, 540, and 550 coupled respectively to triggers 522, 532, 542, and 552. It will be understood that triggers 522, 532, 542, and 552 may be substantially hollow such that vibrators 520, 530, 540, and 550 may be oriented, in whole or in part, in an interior of the respective trigger. Vibrators 520, 530, 540, and 550 may be oriented within triggers 522, 532, 542, and 552 in order to save space and/or to provide a more localized vibration to said triggers.

Figure 5C:
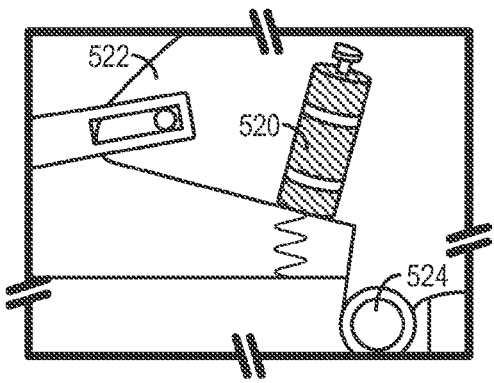

FIG. 5C shows vibrator 520 coupled to trigger 522 and oriented substantially tangentially to trigger axis 524.

Figure 5D:
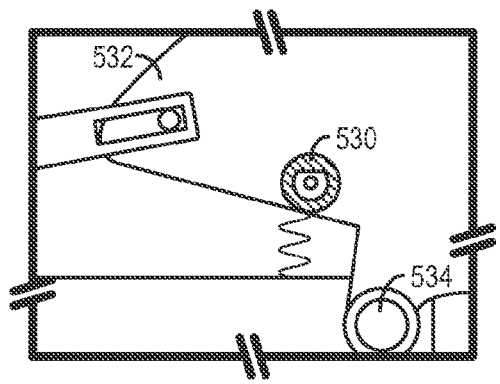

FIG. 5D shows vibrator 530 coupled to trigger 532 and oriented substantially parallel to trigger axis 534.

Figure 5E:
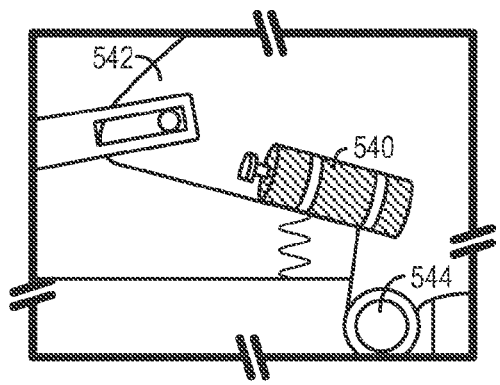

FIG. 5E shows vibrator 540 coupled to trigger 542 and oriented substantially radially to trigger axis 544.

Figure 5F:
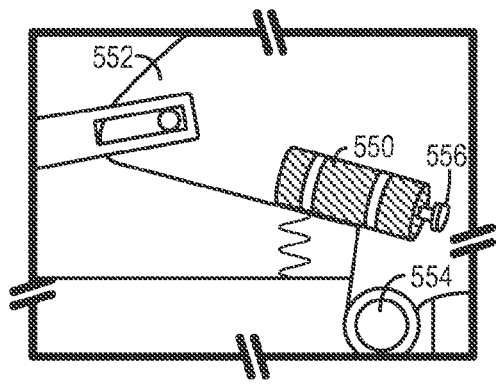

FIG. 5F shows a vibrator 550 couple to trigger 552 and oriented substantially radially to trigger axis 546. In contrast to the configuration of FIG. 5E, vibrator 550 is positioned such that eccentric mass 556 (e.g., mass 306 of FIG. 3A) is oriented towards the trigger surface of trigger 552.

The invention claimed is:

1. An input device comprising:
a communication subsystem configured to provide bidirectional communication with a computing device;
a force feedback trigger assembly, including:
a user-actuatable trigger configured to pivot about a trigger axis responsive to an applied external force; and
an encoder communicatively coupled to the communication subsystem and configured to send a pull parameter of the user-actuatable trigger to the computing device via the communication subsystem; and
a trigger vibrator directly coupled to the force feedback trigger assembly and communicatively coupled to the communication subsystem, the trigger vibrator configured to vibrate the user-actuatable trigger responsive to a vibration signal received from the computing device via the communication subsystem.

2. The input device of claim 1, wherein the trigger vibrator includes a rotary motor configured to rotate an eccentric mass about a mass axis.

3. The input device of claim 2, wherein the trigger vibrator is directly coupled to the user-actuatable trigger.

4. The input device of claim 3, wherein the mass axis is oriented substantially radially from the trigger axis.

5. The input device of claim 3, wherein the mass axis is oriented substantially tangentially to the trigger axis.

6. The input device of claim 3, wherein the mass axis is oriented substantially parallel to the trigger axis.

7. The input device of claim 3, wherein the trigger is substantially hollow, and wherein the trigger vibrator is coupled to an interior of the trigger.

8. The input device of claim 2, wherein the force feedback trigger assembly further includes a trigger actuator directly coupled between the user-actuatable trigger and the encoder, the trigger actuator being configured to pivot about a actuator axis, and the trigger actuator being further configured to translate pivoting of the user-actuatable trigger to the encoder, and wherein the trigger vibrator is directly coupled to the trigger actuator.

9. The input device of claim 8, wherein the mass axis is oriented substantially radially from the actuator axis.

10. The input device of claim 8, wherein the mass axis is oriented substantially tangentially to the actuator axis.

11. The input device of claim 8, wherein the mass axis is oriented substantially parallel to the actuator axis.

12. An input device comprising:
a communication subsystem configured to provide bidirectional communication with a computing device;
a force feedback trigger assembly, including:
a user-actuatable trigger configured to pivot about a trigger axis responsive to an applied external force; and
an encoder communicatively coupled to the communication subsystem and configured to send a pull parameter of the user-actuatable trigger to the computing device via the communication subsystem; and
a rotary motor directly coupled to the force feedback trigger assembly and communicatively coupled to the communication subsystem, the rotary motor configured to rotate an eccentric mass that vibrates the user-actuatable trigger responsive to a vibration signal received from the computing device via the communication subsystem.

13. An input device comprising:
a communication subsystem configured to provide bidirectional communication with a computing device;
a hollow body;
a body vibrator coupled to an interior of the hollow body and configured to vibrate the hollow body in response to a body vibration signal received from the communication subsystem;
a force feedback trigger assembly coupled to an interior of the hollow body, the force feedback trigger assembly including:
a user-actuatable trigger configured to pivot about a trigger axis responsive to an applied external force; and
an encoder communicatively coupled to the communication subsystem and configured to send a pull parameter of the user-actuatable trigger to the computing device via the communication subsystem;
a trigger vibrator directly coupled to the force feedback trigger assembly and communicatively coupled to the communication subsystem, the trigger vibrator configured to vibrate the user-actuatable trigger responsive to a trigger vibration signal received from the computing device via the communication subsystem.

14. The input device of claim 13, wherein the trigger vibrator includes a rotary motor configured to rotate an eccentric mass about a mass axis.

15. The input device of claim 14, wherein the trigger vibrator is directly coupled to the user-actuatable trigger.

16. The input device of claim 15, wherein the mass axis is oriented substantially radially from the trigger axis.

17. The input device of claim 15, wherein the trigger is substantially hollow, and wherein the trigger vibrator is coupled to an interior of the trigger.

18. The input device of claim 14, wherein the force feedback trigger assembly further includes a trigger actuator directly coupled between the user-actuatable trigger and the encoder, the trigger actuator being configured to pivot about a actuator axis, and the trigger actuator being further configured to translate pivoting of the user-actuatable trigger to the encoder, and wherein the trigger vibrator is directly coupled to the trigger actuator.

19. The input device of claim 18, wherein the mass axis is oriented substantially radially from the actuator axis.

20. The input device of claim 18, wherein the mass axis is oriented substantially tangentially to the actuator axis.

21. An input device comprising:
a communication subsystem configured to provide bidirectional communication with a computing device;
a force feedback trigger assembly, including:
a user-actuatable trigger; and
an encoder communicatively coupled to the communication subsystem and configured to send a pull parameter of the user-actuatable trigger to the computing device via the communication subsystem; and
a trigger vibrator directly coupled to the force feedback trigger assembly and communicatively coupled to the communication subsystem, the trigger vibrator configured to vibrate the user-actuatable trigger responsive to a vibration signal received from the computing device via the communication subsystem.

22. The input device of claim 21, wherein the user-actuatable trigger is coupled to a spring.

* * * * *